(12) United States Patent
Rozenblit et al.

(10) Patent No.: US 8,768,273 B2
(45) Date of Patent: Jul. 1, 2014

(54) SYSTEMS AND METHODS FOR POWER SENSING AND ANTENNA TUNING

(76) Inventors: Dmitriy Rozenblit, Irvine, CA (US); Masoud Kahrizi, Irvine, CA (US)

( * ) Notice: Subject to any disclaimer, the term of this patent is extended or adjusted under 35 U.S.C. 154(b) by 295 days.

(21) Appl. No.: 13/328,518

(22) Filed: Dec. 16, 2011

(65) Prior Publication Data
US 2013/0157598 A1 Jun. 20, 2013

(51) Int. Cl.
*H04B 1/04* (2006.01)
(52) U.S. Cl.
USPC ............... 455/127.2; 455/127.1; 455/522; 455/67.11; 455/24; 370/318; 330/282
(58) Field of Classification Search
USPC .......... 455/127.1–127.3, 522, 120, 68, 276.1, 455/562.1, 63.1, 67.11–67.13, 277.1, 296, 455/114.2, 114.3, 226.1, 245.1, 24; 370/318, 252; 330/105, 110, 143, 282
See application file for complete search history.

(56) References Cited

U.S. PATENT DOCUMENTS

| | | | | |
|---|---|---|---|---|
| 6,032,078 A | * | 2/2000 | Rudie | 607/101 |
| 7,555,276 B2 | * | 6/2009 | Wilcox | 455/276.1 |
| 7,787,839 B2 | * | 8/2010 | Liao | 455/127.1 |
| 8,131,232 B2 | * | 3/2012 | Muhammad | 455/114.2 |
| 8,565,806 B2 | * | 10/2013 | Burdenski et al. | 455/522 |
| 2012/0007691 A1 | * | 1/2012 | Song | 333/124 |

* cited by examiner

*Primary Examiner* — Sujatha Sharma
(74) *Attorney, Agent, or Firm* — Sterne, Kessler, Goldstein & Fox PLLC

(57) ABSTRACT

Systems and methods are provided for detecting forward power sent to an antenna and reflected power reflected back from the antenna. Embodiments of the present invention provide systems and methods for measuring forward and reflected power and controlling the amount of power supplied to the antenna responsive to these measurements. Embodiments of the present invention enable the power sent to the antenna to be dynamically altered when antenna impendence changes (e.g., when the antenna gets too close to another object).

20 Claims, 4 Drawing Sheets

SYSTEMS AND METHODS FOR POWER SENSING AND ANTENNA TUNING

FIELD OF THE INVENTION

This invention relates to antennas and more specifically to antenna power control.

BACKGROUND OF THE INVENTION

In cellular devices and other wireless devices, the transmitter typically includes a power amplifier that drives an antenna for wireless signal transmission, where the power amplifier is further driven by a pre-amplifier. Forward power (e.g., power being sent to the antenna) is typically measured for power control in a wireless transmitter. The power level is monitored to get an estimate of the signal power that is being radiated by the antenna.

However, the accuracy and usefulness of these forward power measurements can be affected by the input impedance of the antenna, which can vary based on objects that are placed in the vicinity of the antenna during operation. When the antenna impedance varies, the impedance match with the output of the power amplifier is affected, and power is reflected back from the antenna to the power amplifier. Accordingly, as the antenna impedance changes, the actual power radiated by the antenna is not the same as the detected forward power because some portion of the power is reflected back from the antenna due to the impedance mismatch between the two devices.

What is needed therefore are systems and methods for adjusting the power sent to an antenna as antenna impedance changes.

BRIEF DESCRIPTION OF THE DRAWINGS/FIGURES

The accompanying drawings, which are incorporated in and constitute part of the specification, illustrate embodiments of the invention and, together with the general description given above and the detailed descriptions of embodiments given below, serve to explain the principles of the present invention. In the drawings.

Figure 1:
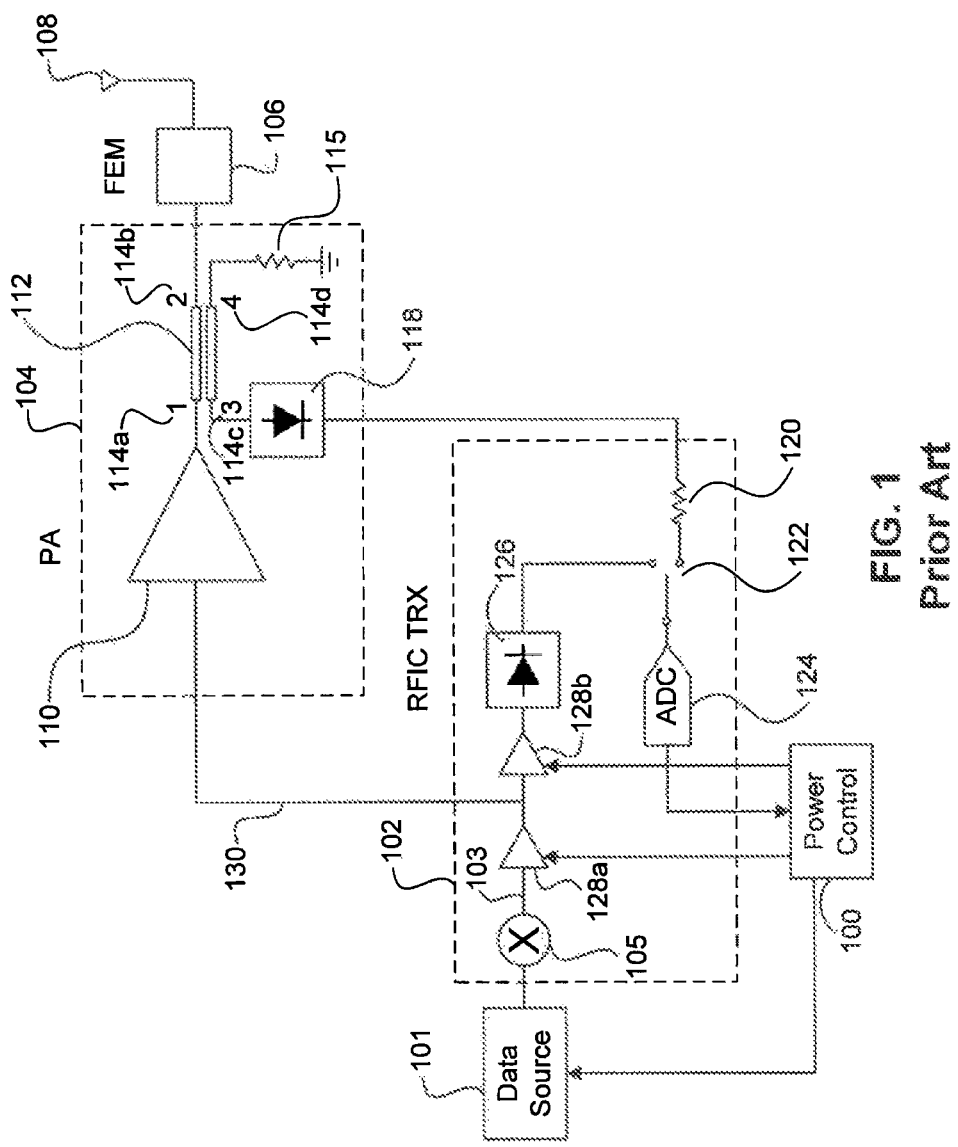
FIG. 1 is a circuit diagram of an antenna power control circuit that controls power to the antenna based on forward power measurements.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. OVERVIEW

In transmitters, antenna impedance can vary based on conditions in the environment (e.g., impedance can be impacted by objects in the vicinity of the antenna). For example, variations in antenna impedance can occur in cellular devices if the cellular handset antenna gets too close to another object (e.g., a user's head). The resulting impact on antenna impedance can disturb the transmit (TX) power control of the cellular handset and push the power amplifier (PA) power beyond normal levels, which can result in poor performance.

In some antennas, forward power (e.g., power being sent to the antenna) is measured for power control. However, these forward power measurements do not always accurately reflect the effects of changing antenna impedance. As impedance at the antenna changes, the power delivered to the antenna is not the same as the detected forward power because some power is reflected back from the antenna.

Embodiments of the present disclosure provide systems and methods for compensating for changes in antenna impedance when controlling the power sent to an antenna. For example, embodiments of the present disclosure provide systems and methods for measuring reflected power from an antenna when implementing power control.

Thus, embodiments of the present disclosure advantageously enable the amount of power sent to an antenna to be dynamically altered when antenna impendence changes, when the antenna gets too close to another object. Further, embodiments of the present disclosure provide power control for PAs both with and without an internal power detector.

2. SYSTEMS

Figure 2:
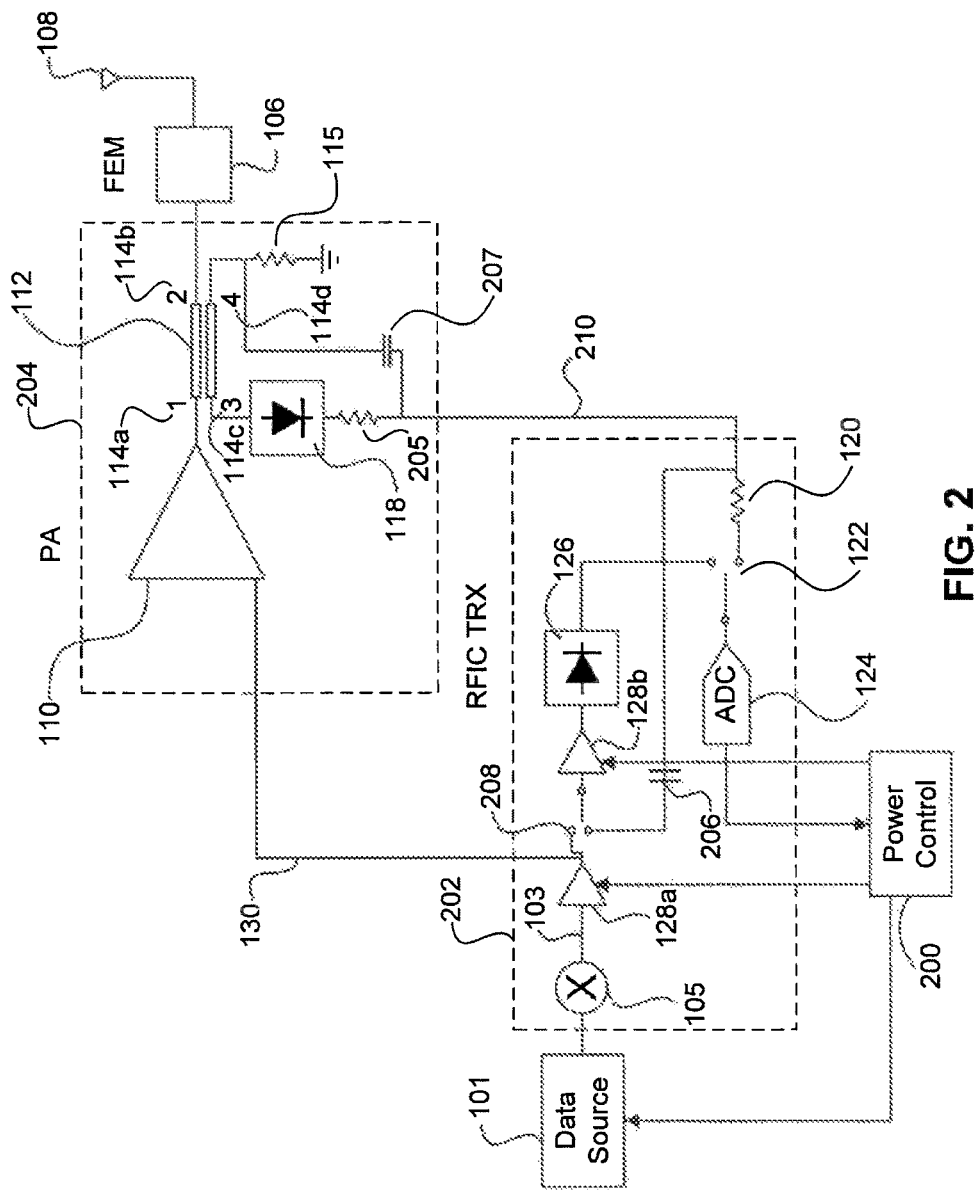
FIG. 2 is a circuit diagram of an antenna power control circuit that detects both forward power sent to an antenna and reflected power from the antenna.

Systems and apparatuses for power control in accordance with embodiments of the present disclosure will now be described with reference to FIGS. 1 and 2. FIG. 1 is a diagram of power control circuitry that detects forward power, and FIG. 2 is a diagram of a circuit that includes functionality for detecting reflected power in addition to detecting forward power.

2.1 Forward Power Detection

FIG. 1 is a circuit diagram of a conventional antenna power control circuit that controls the amount of power sent to antenna 108 based on forward power measurements. In FIG. 1, data source 101 provides a data signal 103 to radio frequency integrated circuit transceiver (RFIC TRX) 102. For example, data source 101 may be a baseband processor that generates the input signal 103 for wireless transmission. RFIC TRX 102 upconverts (e.g., using mixer 105) and amplifies input signal 103 to generate a modulated RF signal 130 that is sent to power amplifier module 104 for further amplification prior to transmission by antenna 108. RFIC TRX 102 also receives a forward power measurement from power amplifier (PA) module 104, which is used to modify the power supplied to FA module 104, as necessary. The output of PA module 104 is coupled to the antenna 108 through a front end module (FEM) 106 to complete the wireless transmission.

PA module 104 includes a power amplifier 110 that outputs a signal to a directional coupler 112. Directional couplers are passive circuit elements that can be used to couple a defined amount of power from one port to another port (e.g., for measurement). Directional coupler 112 has four ports 114. Port 114*a* is an input port, coupled to the output of PA 110, and receives signal power destined for transmission by antenna 108. Port 114*b* is a transmit port for delivering most of the signal power to antenna 108. Port 114*c* is the coupled port that delivers a portion of the signal power to internal detector 118 for measurement. Port 114*d* is a terminated port, coupled to resistor 116, which is grounded.

Transmit port 114*b* couples to FEM 106 for delivering power to antenna 108 for wireless transmission. In an embodiment, FEM 106 contains circuitry (e.g., filters, duplexes, and switches) for multiplexing multiple transmitters or receivers onto a single antenna 108 using the power supplied from port 114*b*. While FEM 106 is shown coupled to port 114*b* in FIGS. 1 and 2, it should be understood that FEM 106 could also be placed before directional coupler 112. For example, in an embodiment, FEM 106 is coupled to the output of power amplifier 110 and to the input of port 114*a* of directional coupler 112. For example, in a multiband embodiment having multiple power amplifiers 110, FEM 106 can be moved before coupler 112 so that multiple couplers 112 are not required.

In an embodiment, directional coupler 112 provides power to both port 114*b* (for transmission to antenna 108) and port 114*c* (for a measurement of forward power). The amount of power supplied to port 114*c* is a predefined portion of the power delivered to port 114*b* and is determined by the properties of directional coupler 112. Internal detector 118 can detect the signal power coupled to port 114*c*, which is a known percentage of that delivered to the transmit port 114*b*. Therefore, by measuring the signal power from port 114*c*, internal detector 118 (or a controller coupled thereto) can determine the forward power (transmitted to antenna 108 via transmit port 114*b*) and can output a signal representative of the forward power to RFIC TRX 102. For example, internal detector 118 can measure the envelope amplitude of the signal outputted by port 114*c*. In an embodiment, internal detector 118 is a diode detector. As the power supplied to PA module 104 increases, the measurement of forward power from port 114*c* increases, and as the power supplied to PA module 104 decreases, the measurement of forward power from port 114*c* decreases.

RFIC TRX 102 includes amplifiers 128*a*, 128*b*, multiplexer 122, resistor 120 and analog-to-digital converter (ADC) 124. Resistor 120 receives the measurement signal representative of the forward power that is sent from internal detector 118 and drops the voltage to a level suitable for the circuitry of RFIC TRX 102. During normal mode (e.g., not during a low power mode), multiplexer 122 is configured (e.g., by power control module 100) to couple the measurement signal from the output of internal detector 118 to analog to digital converter (ADC) 124, so as to convert the measurement signal to digital format. ADC 124 generates a digital signal that is sent to power control module 100 representative of the detected forward power sent to antenna 108.

Using this digital signal, power control module 100 can determine how much signal power 130 to send to antenna 108. For example, power control module 100 can determine an appropriate quantized power level to supply to PA module 104. Alternatively, power control module 100 can dynamically alter the power supplied to PA module 104 in a continuous, analog fashion based on the detected forward power. To implement the power control, the power control module 100 can instruct the data source 101 to adjust the amplitude of the input signal 103. The signal amplitude can be adjusted up or down to increase or decrease the signal power. For example, this signal can be amplified by one or more amplifiers (e.g., by amplifier 128*a*), and the output 130 can be supplied to PA module 104 to provide power to PA 110. Alternatively, power control module 100 can adjust the gain of amplifiers 128 responsive to the detected forward power in order to adjust the power to PA module 104, instead of or in addition to adjusting the input signal amplitude.

In a low power mode, internal detector 118 may not be able to detect any forward power when the forward power is below the minimum threshold of detection. In low power mode, signal power 130 is low by design, as is the output of PA 110. Accordingly, if the power output from port 114*c* is a very small fraction of the power input to port 114*a* (e.g., due to the characteristics of directional coupler 112), then this very small fraction of power may not be detectable by internal detector 118. In such a case, multiplexer 122 can be switched via a control signal initiated by power control module 100 to couple internal detector 126 to the ADC 124. Internal detector 126 measures forward power sent to PA module 104 before it is ever transmitted 130 to PA module 104. The multi-stage amplifiers (e.g., amplifiers 128) before detector 126 and after the power branch 130 to PA module 104 assist internal detector 126 in detecting power in the low power state (e.g., before power is amplified by PA 110). Internal detector 126 sends a signal representative of the detected forward power to power control module 100 via multiplexer 122. Once the detected forward power reaches a certain threshold (e.g., once the power is high enough for internal detector 118 to detect the fraction of power output from port 114*c*), the power control circuitry of FIG. 1 can transition back to a normal mode, and multiplexer 122 can be switched (e.g., by power control module 100) to couple ADC 124 to internal detector 118 in the PA module 104, as discussed above.

While internal detector 118 can measure forward power sent to antenna 108, internal detector 118 does not detect the impact of variations in impedance on antenna 108. For example, internal detector 118 does not detect the effects of antenna impedance variation that results when antenna 108 is too close to another object (e.g., in the case of a cellular handset, the user's head). A varying input impedance of antenna 108 can initiate a change in the power of power amplifier 110 and can cause the power supplied to power amplifier 110 to exceed desirable operating level, which can negatively impact performance, and even cause failure of the power amplifier 110. Accordingly, embodiments of the present disclosure provide systems for detecting this change in impedance by detecting reflected power from antenna 108.

2.2 Reflected Power Detection

FIG. 2 is a circuit diagram of an antenna power control circuit that measures both forward and reflected power from antenna 108, according to embodiments of the present disclosure. Forward power is detected using internal detector 118, where the output of internal detector 118 is a low frequency or DC signal (e.g., a maximum of 0.2 MHz). Reflected power from antenna 108 is detected using the terminated port 114d of directional coupler 112 that is grounded through the resistor 115. In the circuit of FIG. 2, an RF signal is tapped from the output of port 114d prior to the resistor 115 so as to measure S-parameter $S_{42}$, and this RF signal is combined with the low frequency signal from internal detector 118 and passed to modified RFIC TRX 202. In a cellular handset embodiment, the operating frequency of the RF signals for transmission (e.g., signal 130) are substantially higher than DC, and are on the order of 700 MHz to 3.5 GHz for cellular. Accordingly, there is significant frequency separation between the detector 118 low frequency output and the RF signals (i.e., high frequency signals) detected at port 114d. Modified PA module 204 of FIG. 2 includes a high pass filter formed using capacitor 207 and resistor 205. The signal output from port 114d is input to capacitor 207, which passes high frequencies to RFIC TRX 202.

Thus, embodiments of the present disclosure advantageously use a shared interface line 210 between PA module 204 and RFIC TRX 202 for both forward and reflected power detection. When the signals reach RFIC TRX 202, low frequency signals (e.g., the forward power signal generated by internal detector 118) are processed by ADC 124, and high frequency signals (e.g., the high frequency signal representative of the reflected power passed by capacitor 205) will be passed by capacitor 206. In other words, portions of RFIC TRX 202 act as a frequency divider circuit. Thus, embodiments of the present disclosure enable internal detector 126 (which was used to detect forward power in a low power condition in FIG. 1) to detect reflected power when connected by multiplexer 208.

For example, capacitor 206 in RFIC TRX 202 does not pass the low frequencies representative of forward power signal generated by the detector 118. Instead, as in FIG. 1, the low frequency signal representative of forward power is passed to ADC 124 and then to power control module 200. Capacitor 206 does, however, pass the high frequencies representative of reflected power from port 114d. The high frequency signal representative of reflected power is then transmitted to multiplexer 208, which can be switched to couple capacitor 206 to amplifier 128b and internal detector 126, which detects the reflected power in the high frequency signal and generates a signal representative of the reflected power.

In an embodiment, the power control circuitry of FIG. 2 continuously switches multiplexers 122 and 208 to take forward power measurements and reflected power measurements, in an alternating fashion. For example, when the power control circuitry of FIG. 2 is configured in a forward power measurement mode, multiplexer 122 is switched (e.g., via a control signal generated by power control module 200) to couple resistor 120 to ADC 124. ADC 124 outputs the low frequency forward power signal to power control module 200. When the power control circuitry of FIG. 2 is configured in a reflected power measurement mode, multiplexer 208 is switched (e.g., via a control signal generated by power control module 200) to couple capacitor 206 to amplifier 128b, and multiplexer 122 is switched (e.g., via a control signal generated by power control module 200) to couple internal detector 126 to ADC 124. Amplifier 128b amplifies the high frequency reflected power signal passed by capacitor 206 and inputs it into internal detector 126, which detects the reflected power in the high frequency signal and generates a low frequency (or DC) signal representative of the reflected power. This low frequency signal is passed via multiplexer 122 to ADC 124, which generates a digital signal representative of reflected power and sends the digital signal to power control module 200.

By continuously switching multiplexers 122 and 208 as described above, power control module 200 can obtain measurements of forward power and reflected power and can modify the power transmitted to PA module 204 accordingly. In an embodiment, multiplexers 122 and 208 can be switched at a high rate (e.g., every 10 to 200 microseconds) to obtain accurate forward and reflected power readings. These power readings are used by power control module 200 to alter the power supplied to the PA module 204 so as to compensate for changing antenna impedance. For example, in an embodiment, power control module 200 uses a ratio of forward power to reflected power to determine how much power to supply to PA module 204. If significant power transmitted to antenna 108 is being reflected (e.g., due to high antenna impedance), power control module 200 can attempt to increase the power sent to PA module 204, so as to compensate for the reflected power. However, if high power reflection is detected, and if the power being transmitted to PA module 204 is already close to a maximum power that the power amplifier 110 can supply, then power control module 200 may determine that the power should stay at the same level, or even be lowered.

As described above, it is noted that output of detector 118 is a low frequency signal that indicates, or is representative of, forward power delivered to the antenna 108. The high frequency signal tapped at port 114d of the directional coupler 112 is the actual reflected signal, the power of which has not yet been detected. Hence, this is why both of these signals can share the same transmission medium 210. In light of this, it may be useful to refer to the output of detector 118 as a "measured (or detected) forward power signal," as it carries information that indicates the value of measured forward power. Likewise, it may be useful to refer to the output of port 114d as a "reflected signal" or "reflected power signal." Once the reflected power is actually detected or measured by detector 126, the output of the detector 126 may be referred to as a "measured (or detected) reflected power signal" to be consistent with the output of detector 118.

Embodiments of the present disclosure advantageously provide a low-cost solution for measuring both forward power sent to an antenna and reflected power from the antenna. It is noted that detector 126 provides dual functionality, in that it measures forward power, in low power mode, and reflected power, based on the settings of multiplexers 208 and 122. Embodiments of the present disclosure use the forward and reverse power measurements to adjust the signal power sent to PA module 204 as the antenna impedance changes.

In an embodiment, power control module 200, RFIC TRX 202, PA module 204, and FEM 106 are implemented on the same integrated circuit (IC), for example on the same silicon substrate. However, it should be understood that power control module 200, RFIC TRX 202, PA module 204, FEM 106, and data source 101 can be implemented using any number of ICs. Further, it should be understood that power control module 200 can be a hardware, software, or firmware module configured to monitor forward and/or reflected power measurements as described above.

3. METHODS

Figure 3:
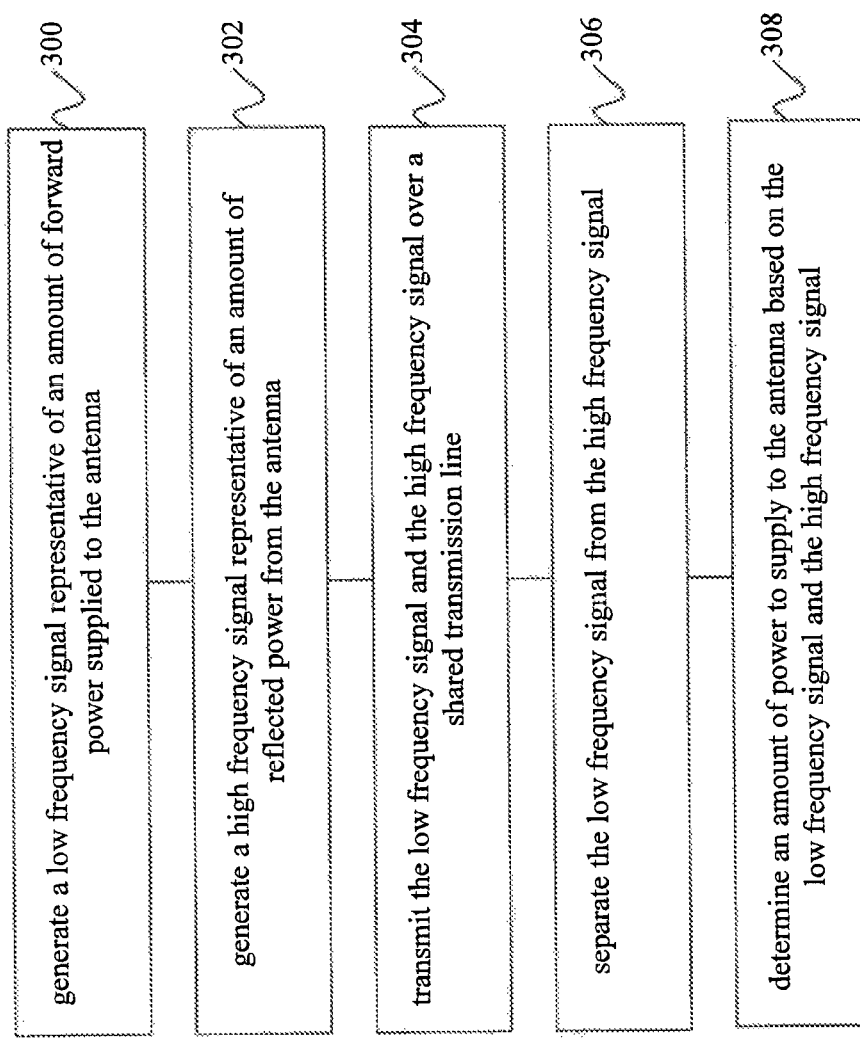
FIG. 3 is a flowchart of a method for controlling power supplied to an antenna.

FIG. 3 is a flowchart of a method for controlling power supplied to an antenna (e.g., antenna 108) in accordance with an embodiment of the present disclosure. In step 300, a low frequency signal representative of an amount of forward power supplied to the antenna is generated. For example, internal detector 118 is coupled to a port of directional coupler 112, which is configured to output a fraction of the forward power supplied by power amplifier 110. Internal detector 118 generates a low frequency signal representative of this forward power.

In step 302, a high frequency signal having reflected power from the antenna is generated. For example, capacitor 207 is configured to receive the high frequency signal from port 114d of directional coupler 112, the high frequency signal indicative of power reflected to port 114b of directional coupler 112 from antenna 108. Capacitor 207 passes high frequency signal for further processing.

In step 304, the low frequency signal and the high frequency signal are transmitted over a shared transmission line. For example, internal detector 118 and capacitor 207 pass forward and reflected power signals, respectively, over a shared transmission line 210 to RFIC TRX 202.

In step 306, the low frequency signal is separated from the high frequency signal. For example, portions of RFIC 202 act as a frequency divider to split the combined high frequency signal and low frequency signal. The low frequency signal is passed to power control module 200 via multiplexer 122 and ADC 124. Capacitor 206 passes the high frequency signal to multiplexer 208, which can passes the high frequency signal to internal detector 126 for detection. After the signal is detected, multiplexer 126 passes the detected reflected power signal to ADC 124 and power control module 200 for further processing.

In step 308, an amount of power to supply to the antenna is determined based on the low frequency signal and the high frequency signal. For example, in an embodiment, power control module 200 can continuously toggle multiplexers 122 and 208 to obtain forward and reflected power readings. Based on these readings, power control module can determine an appropriate amount of power to supply to antenna 108. For example, if high reflected power is measured, power control module 200 may determine that power to antenna 108 should be increased. However, if the power supplied to antenna 108 is near a maximum possible amount, power control module 200 may determine that power to antenna 108 should be decreased.

Figure 4:
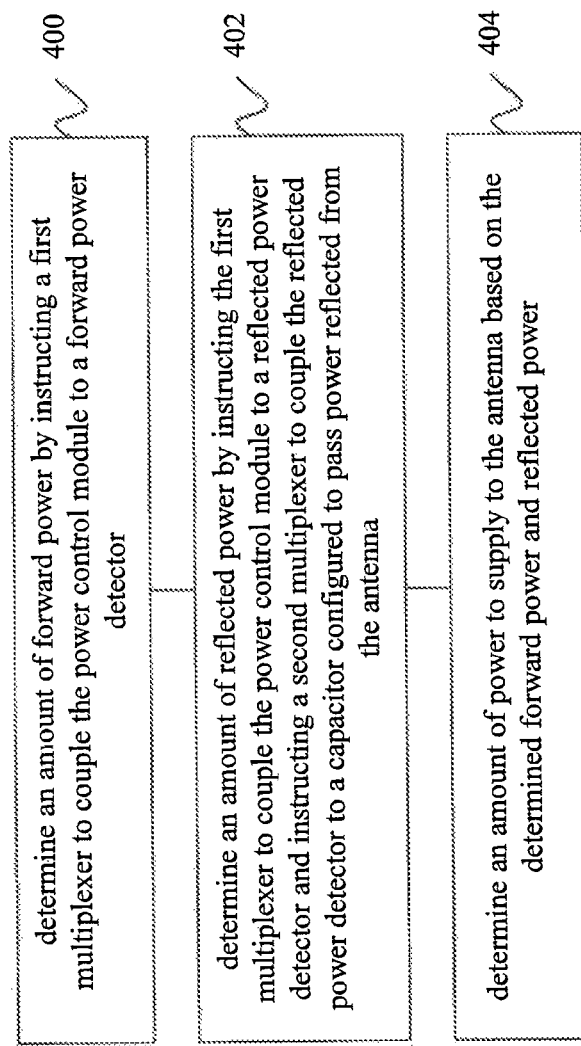
FIG. 4 is another flowchart of a method for controlling power supplied to an antenna.

FIG. 4 is another flowchart of a method for controlling power supplied to an antenna in accordance with an embodiment of the present disclosure. In step 400, an amount of forward power is determined by instructing a first multiplexer to couple the power control module to a forward power detector. For example, to pass a forward power measurement to power control module 200, multiplexer 122 couples power control module 200 to the transmission line from PA module 204, which is coupled to an output of internal power detector 118.

In step 402, an amount of reflected power is determined by instructing the first multiplexer to couple the power control module to a reflected power detector and instructing a second multiplexer to couple the reflected power detector to a capacitor configured to pass power reflected from the antenna. For example, to pass a reflected power measurement to power control module 200, multiplexer 122 couples internal power detector 126 to power control module 200 (through ADC 124), and multiplexer 208 couples internal power detector 126 to capacitor 206. Capacitor 206 passes high frequencies representative of reflected power from antenna 108.

In step 404, an amount of power to supply to the antenna is determined based on the determined forward power and reflected power. For example, power control module 200 uses the detected forward power and reflected power to determine how much power to supply to PA module 204. To supply power to PA module 204, multiplexer 208 couples input data signal 103 to power amplifier 110 via amplifier 128b.

4. ADVANTAGES

As previously discussed, embodiments of the present disclosure support both forward power measurements and reflected power measurements and enable power supplied to antenna 108 to be dynamically altered responsive to these measurements. Thus, embodiments of the present disclosure enable higher performance when antenna impedance changes. For example, in the case of a cellular handset, embodiments of the present disclosure detect the change in reflected power due to impedance caused when the handset is very close to a user's head. This change in impedance causes the reflected power to increase. When this reflected power increase is detected (e.g., by internal detector 126), power control module 200 can determine that power sent to antenna 108 should be increased or decreased depending on a variety of factors (e.g., such as the current power supplied to antenna 108).

Embodiments of the present disclosure advantageously achieve this functionality with nearly zero added cost when compared with solutions for detecting forward power only. For example, embodiments of the present disclosure modify the forward power detection circuitry of FIG. 1 to support reflected power detection by adding a high pass filter (using capacitor 207 and resistor 205), capacitor 206, and multiplexer 208 to result in the circuit of FIG. 2, which supports both forward and reflected power detection. Thus, a high amount of added functionality is achieved using a minimal amount of added circuitry. Further, by transmitting the high frequency RF reflected power signal passed by capacitor 207 on top of the low frequency DC forward power signal generated by internal detector 118, both forward power and reflected power signals can be sent to RFIC TRX 202 without requiring an additional transmission line for reflected power.

Further, the reflected power monitoring and measurement described above can be used to provide power control module 200 with an indication of the impedance encountered by antenna 108. Antenna 108 can then be tuned (e.g., responsive to signals generated by power control module 200 and/or FEM 106) to adjust for this encountered impedance.

5. CONCLUSION

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g. software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present invention should not be limited by any of the above-described exemplary embodiments, but should be defined only in accordance with the following claims and their equivalents.

What is claimed is:

1. A power control system for an antenna, the system comprising:
   a directional coupler coupled to an output of a power amplifier;
   a first detector coupled to an output of a first port of the directional coupler, wherein the first detector is configured to detect forward power output from the power amplifier and to generate a forward power signal;
   a first capacitor coupled to an output of a second port of the directional coupler, wherein the first capacitor is configured to pass a reflected power signal representative of power reflected from the antenna; and
   a power control module coupled to an input of the power amplifier configured to determine an amount of power supplied to the power amplifier based on the forward power signal and the reflected power signal.

2. The power control system of claim 1, wherein a third port of the directional coupler is coupled to the output of the power amplifier, wherein the first port of the directional coupler is configured to output a predefined portion of power supplied to the third port, and wherein the first detector is configured to detect the forward power by detecting the predefined portion of power supplied to the third port.

3. The power control system of claim 1, wherein a fourth port of the directional coupler is coupled to an input of the antenna, wherein the second port is coupled to ground, and wherein the reflected power signal received by the first capacitor is caused by power reflected from the antenna to the fourth port.

4. The power control system of claim 3, wherein antenna impedance causes power to be reflected from the antenna to the fourth port.

5. The power control system of claim 1, wherein the first detector is configured to output a low frequency signal as the forward power signal, and wherein the first capacitor is configured to output a high frequency signal as the reflected power signal.

6. The power control system of claim 1, wherein the first detector and the first capacitor output the forward power signal and the reflected power signal over a shared transmission line.

7. The power control system of claim 1, further comprising a multiplexer coupled to the power control module, wherein the multiplexer is configured to pass the forward power signal to the power controller responsive to receiving a control signal indicating that forward power is to be measured.

8. The power control system of claim 7, further comprising an analog to digital converter (ADC) configured to convert the forward power signal into a digital signal before the forward power signal is passed to the power control module.

9. The power control system of claim 1, further comprising:
   a second capacitor configured to receive the reflected power signal; and
   a multiplexer coupled to an output of the second capacitor, wherein the multiplexer is configured to pass the reflected power signal to a second detector responsive to receiving a control signal indicating that reflected power is to be measured, and wherein the second detector is configured to send a low frequency reflected power signal to the power control module.

10. A system, comprising:
    a power amplifier module coupled to an antenna, wherein the power amplifier module includes:
       a power amplifier coupled to a directional coupler,
       a first detector coupled to a first port of the directional coupler, wherein the first detector is configured to output a forward power signal to a transmission line, and
       a first capacitor coupled to a second port of the power amplifier, wherein the first capacitor is configured to output a reflected power signal to the transmission line;
    a transceiver module coupled to the transmission line; and
    a power control module coupled to the transceiver module, wherein the power control module is configured to alter an amount of power supplied to the power amplifier module based on the forward power signal and the reflected power signal.

11. The system of claim 10, further comprising:
    a front end module coupled to the antenna, wherein the front end module includes circuitry for multiplexing multiple transmitters and receivers onto the antenna.

12. The system of claim 10, wherein the power control module is further configured to:
    detect an input impedance of the antenna based on the reflected power signal, and
    generate a tuning signal for the antenna based on the detected amount of impedance.

13. The system of claim 10, wherein the transceiver module includes:
    a second detector configured to generate a low frequency reflected power signal; and a first multiplexer coupled to the power control module, wherein the first multiplexer is configured to:
couple the power control module to the transmission line, and
couple the power control module to the second detector.

14. The system of claim 13, wherein the transceiver module further includes:
a second capacitor coupled to the transmission line; and
a second multiplexer coupled to the second detector, wherein the second multiplexer is configured to:
couple the second capacitor to the second detector; and
couple the power control module to the second detector.

15. The system of claim 14, wherein the power control module is configured to generate a first control signal instructing the first multiplexer to couple the power control module to the transmission line to pass the forward power signal to the power control module.

16. The system of claim 15, wherein the power control module is configured to generate a second control signal instructing the first multiplexer to couple the power control module to the second detector and instructing the second multiplexer to couple the second capacitor to the second detector to pass the low frequency reflected power signal to the power control module.

17. The system of claim 16, wherein the power control module is configured to continuously generate the first control signal and the second control signal to continuously determine forward power and reflected power.

18. The system of claim 16, wherein the power control module is configured to generate a third control signal instructing the second multiplexer to couple the power control module to the second detector to supply power to the power amplifier module.

19. A method for controlling power supplied to an antenna, the method comprising:
generating a low frequency signal representative of an amount of forward power supplied to the antenna;
generating a high frequency signal representative of an amount of reflected power from the antenna;
transmitting the low frequency signal and the high frequency signal over a shared transmission line;
separating the low frequency signal from the high frequency signal; and
determining an amount of power to supply to the antenna based on the low frequency signal and the high frequency signal.

20. The method of claim 19, wherein the low frequency signal is generated by a detector that detects forward power supplied to the antenna, and wherein the high frequency signal is output from a capacitor coupled to the antenna, wherein the capacitor receives power reflected by the antenna and passes high frequencies of the power reflected by the antenna to the shared transmission line.

* * * * *